United States Patent
Shiue et al.

(10) Patent No.: US 6,512,667 B2
(45) Date of Patent: Jan. 28, 2003

(54) SUPERCAPACITORS AND METHOD FOR FABRICATING THE SAME

(75) Inventors: Lih-Ren Shiue, Taoyuan Hsien (TW); Dien-Shi Wu, Taoyuan Hsien (TW); Ching-Wen Chao, Changhua Hsien (TW); Jiung-Jau Jou, Miaoli Hsien (TW)

(73) Assignee: Luxon Energy Devices Corporation, Hsinchu (TW)

( * ) Notice: Subject to any disclaimer, the term of this patent is extended or adjusted under 35 U.S.C. 154(b) by 0 days.

(21) Appl. No.: 09/784,718

(22) Filed: Feb. 15, 2001

(65) Prior Publication Data

US 2002/0163770 A1 Nov. 7, 2002

(51) Int. Cl.$^7$ .............................. H01G 9/00; H01M 4/96
(52) U.S. Cl. ..................... 361/502; 361/503; 361/508; 361/518; 361/523; 429/40; 429/44
(58) Field of Search ................................ 361/502, 503, 361/504, 508, 509, 516, 528, 512, 518, 505, 522, 523; 429/218, 40, 44, 46, 128, 129

(56) References Cited

U.S. PATENT DOCUMENTS

| | | | |
|---|---|---|---|
| 3,563,963 A | | 2/1971 | Beier et al. |
| 4,011,365 A | * | 3/1977 | Lindstrom .................... 429/60 |
| 4,101,783 A | * | 7/1978 | Hutter ......................... 250/540 |
| 4,215,158 A | * | 7/1980 | Hattori et al. ............... 427/130 |
| 4,631,140 A | * | 12/1986 | Steck et al. ............... 252/62.56 |
| 4,717,595 A | | 1/1988 | Watanabe et al. |
| 4,737,889 A | | 4/1988 | Nishino et al. |
| 4,810,599 A | * | 3/1989 | Kondo et al. ............... 429/191 |
| 5,079,674 A | | 1/1992 | Malaspina |
| 5,199,961 A | * | 4/1993 | Ohsaki et al. ................. 48/94 |
| 5,319,518 A | | 6/1994 | Blood |
| 5,351,164 A | | 9/1994 | Grigortchak et al. |
| 5,369,547 A | | 11/1994 | Evans |
| 5,464,453 A | | 11/1995 | Tong et al. |
| 5,498,489 A | * | 3/1996 | Dasgupta et al. ............ 424/152 |
| 5,558,680 A | | 9/1996 | Takeuchi et al. |
| 5,587,872 A | * | 12/1996 | Lian et al. .................... 361/525 |
| 5,591,540 A | * | 1/1997 | Louie et al. .................. 429/163 |
| 5,600,535 A | | 2/1997 | Jow et al. |
| 5,674,642 A | | 10/1997 | Le et al. |
| 5,872,698 A | * | 2/1999 | Bai et al. ..................... 361/503 |
| 5,925,170 A | * | 7/1999 | Nojima .......................... 96/71 |
| 5,963,417 A | * | 10/1999 | Anderson et al. ........... 361/503 |
| 5,980,977 A | | 11/1999 | Deng et al. |
| 5,986,878 A | * | 11/1999 | Li et al. ...................... 361/523 |
| 6,064,561 A | | 5/2000 | Harada et al. |
| 6,222,723 B1 | * | 4/2001 | Razoumov et al. ......... 361/503 |
| 6,275,371 B1 | | 8/2001 | Yoshio et al. |
| 6,356,433 B1 | * | 3/2002 | Shi et al. ..................... 361/502 |
| 2001/0030847 A1 | * | 10/2001 | Kim et al. ................... 361/512 |

FOREIGN PATENT DOCUMENTS

JP    360093311 A    *  5/1985

OTHER PUBLICATIONS

"Porous Nickel Oxide/Nickel Films for Eletrochemical". Kuo–Chuan Liu and Marc A. Anderson / J. Electrochem. Soc., vol. 143 No. 1, Jan. 1996/p. 124–130.

* cited by examiner

Primary Examiner—Anthony Dinkins
Assistant Examiner—Ha Nguyen
(74) Attorney, Agent, or Firm—J.C. Patents

(57) ABSTRACT

Using thin-films of iron oxide as the active material of electrodes, supercapacitors are fabricated on various substrates in different shapes. By chemical oxidation the iron-oxide film is formed directly and conformably on the substrates in a short period of cooking. The iron oxide has a chemical composition of $Fe_xO_yH_z$, where $1.0 \leq x \leq 3.0$, $0.0 \leq y \leq 4.0$, and $0.0 \leq z \leq 1.0$. Substrates, as the current collector, tested includes Al, Ti, Fe, Cu and Ni. Measurements by cyclic voltammetry indicates that the iron-oxide electrodes in a selected electrolyte can store charges as high as 0.5 F/cm$^2$ or 417 F/g of the electrode materials. Supercapacitors as prepared are economical and can be used as enclosure housings for portable electronics, power tools, and batteries. The supercapacitors can also be integrated with the frames and chassis of electric vehicles.

16 Claims, 5 Drawing Sheets

SUPERCAPACITORS AND METHOD FOR FABRICATING THE SAME

BACKGROUND OF THE INVENTION

1. Field of Invention

The present invention relates to an energy storage device that can enhance the performances of batteries in numerous applications. More specifically, the present invention relates to the preparation of supercapacitors using iron oxide as the active material of electrodes.

2. Description of Related Art

Supercapacitor is also known as ultracapacitor or electric double layer capacitor. In rigid terms, although there is some distinction among them, they all can store a large quantity of charges up to several thousands farad (F) in compact size. Typically, when a capacitor with capacitance greater than 0.1 F, it is called a supercapacitor. Supercapacitor stores energy through surface adsorption of charges, which may or may not involve redox (reduction-oxidation) reactions. In either case, the adsorption only occurs at the electrode-electrolyte interface. As a consequence, supercapacitor can be charged and discharged very rapidly. With the capability of delivering high peak-current, supercapacitor can be a load-leveling device for batteries. On the other hand, supercapacitor may be the sole power source for loads requiring small currents.

The heart of supercapacitors is the electrode that determines the performances and cost of supercapacitors. Two components, an electronic conductor and an active material, form the electrodes. The former is to conduct electrons, and the latter is to adsorb charged species from the electrolyte. While the nature of the two components is important, the technique of disposing the said active material on the said conductor is also critical. Besides electrical requirements, the ideal electrodes should be constructed in monolithic structure without allowing the current collector to be in contact with the electrolyte during the lifetime of capacitors. There are three commonly employed methods in the literature: roller coating (cf. U.S. Pat. Nos. 4,737,889; 5,351,164; 5,558,680; 5,674,642), die molding (cf. U.S. Pat. Nos. 3,536,963; 4,717,595; 5,079,674; 5,136,473; 6,064,561) and dip coating (cf. U.S. Pat. Nos. 5,369,547; 5,464,453; 5,600,535; J. Electrochem. Soc., Vol. 143, pp124–130, 1996).

A binder, generally an organic polymer, is used in the first two methods so that the powdery active materials can be conglomerated. However, the binder will increase the resistance of the electrodes and impair the effective surface area of the active materials. In order to attain a sufficient thickness of deposition, dip coating has to be conducted many times with heat treatments followed each dip. The process is time-consuming, and the dipping solution is subjected to heat that will affect the quality of deposited films. Incidentally, both die molding and dip coating may yield monolithic electrodes.

SUMMARY OF THE INVENTION

As discussed in greater detail below, the present invention provide a method for fabricating economical supercapacitors for power applications. The method of the present invention to form a supercapacitor includes using iron oxide as the active material of electrodes, where iron oxide with a chemical composition of $Fe_xO_yH_z$, where $1.0 \leq x \leq 3.0$, $0.0 \leq y \leq 4.0$, and $0.0 \leq z \leq 1.0$. The iron oxide can be directly grown on iron, steel and iron-deposited substrates.

An object of the present invention is to grow the $Fe_xO_yH_z$ film in chemical reactions using $KMnO_4$ and $NaNO_3$ as oxidizing agents. $Fe_xO_yH_z$ may be FeO, $Fe_3O_4$, $Fe_2O_3$ or FeO(OH) in which $Fe_3O_4$, the magnetite, is the major species that the high energy-storage capacitance is accredited to.

Another object of the present invention is to provide a conformal growth of iron-oxide film directly on substrates in the shape of plane, tube, angled frame and wrinkled plate. The substrates are submerged in solution during chemical oxidation, thus the iron-oxide film is deposited uniformly on every corner of the substrates.

Still another object of the present invention is to offer the growth of iron-oxide film on non-iron metallic substrates, as well as on nonconductors such as plastics, glass and ceramics. For the non-iron metals and nonconductors, metal iron has deposited prior to chemical oxidation. The deposition of iron metal can be achieved by electrolytic plating, electroless plating, chemical conversion, and combination thereof. As long as the iron metal can be successfully deposited on the substrates, it can be oxidized to the magnetite film easily.

Still another object of the present invention is to fabricate economical supercapacitors in various forms. Such supercapacitors can be integrated in the enclosure housings for lap top, hand-held computers, cellulars, power tools and batteries.

In other applications, supercapacitors of the present invention can be integrated with the frames of motorcycles and wheelchairs, with the body of automobiles, and with the light posts that use solar cells to generate electricity. When the supercapacitors are included in the housings, they can provide energy storage to the portable devices so that the batteries will have longer use-time, or the use of battery can be reduced. Similar benefits can be resulted from including in the frames and body of electric vehicles (EVs). Using the economical and light supercapacitors at the expense of expensive and heavy batteries, EVs will soon become practical and well accepted. As the energy storage device for green energies such as sun, wind, tide and heat, supercapacitors can virtually store any current generated by the nature, such currents may be inadequate for charging batteries.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
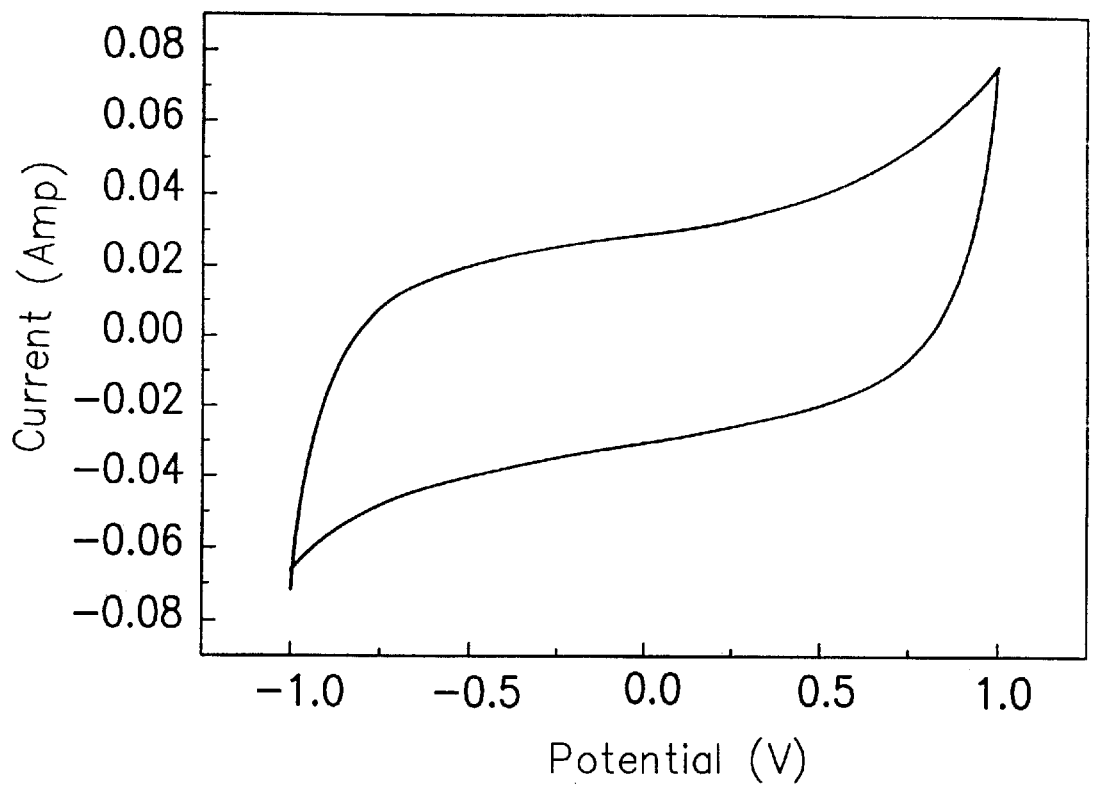
FIG. 1A is a cyclic voltammogram of two electrodes of 2 cm×2 cm $Fe_3O_4$/Fe substrate under 50 mV/sec scanning rate in 0.1M $Na_2SO_4$ and 0.5M KOH, according to the invention.

With examples described below, the present invention introduces a conformal growth of iron-oxide films on iron substrates and substrates deposited with iron metal. Iron oxide, that is, the active material, directly grows on the substrates into monolithic electrodes, thus no binder is necessary. Furthermore, a chemical conversion reaction is used to quickly generate the oxide film uniformly on every corner of the substrates. Using chemical oxidation, very economical supercapacitors can therefore be fabricated in accordance with the shape and the electric requirements of applications. Furthermore, supercapacitors can be integrated with the housings of equipment, appliances, tools and electric vehicles. In spite of the inclusion of supercapacitors, the increase in weight is minimal, whereas the increase in physical dimension is invisible. Nevertheless, the capacitor-included devices, appliances, tools, and vehicles will be benefited from a built-in large power source.

Depending on the electrode materials, supercapacitors may utilize two different mechanisms, double layer (DL) or surface reduction-oxidation, to store electric charges and form double layer capacitance or pseudocapacitance. A DL of opposite charges is automatically formed on the solid-liquid interface when a conductor is placed in an electrolyte solution, which blocks the diffusion of ions or species to the conductor for analysis. DL is thus minimized from the interface of solid and liquid in electrochemical analyses. However, the DL structure is deliberately maximized to store static charges to form DL capacitance in supercapacitors. There is no charge transfer in DL capacitance, yet the psudocapacitance comes from faradaic reactions involving surface or adsorbed species at the electrode-electrolyte interface. It involves faradaic charge transfer occurring at the electrode surface rather than within the bulk as in galvanic cells. Pseudocapacitance can be 10 to 100 times greater than DL capacitance. Both DL capacitance and pseudocapacitance are due to physi-sorption where charges are quickly stored and released, such processes are governed by kinetic balance, and that is the reason why the supercapacitors have high power density.

The energy stored in a capacitor is proportional to its capacitance and working voltage as described by the following formula:

$$E=1/2CV^2 \qquad (1)$$

where E is the energy in joule, C is the capacitance in farad (F), and V is the working voltage of capacitor in volt (V).

Because the energy is proportional to the square of the working voltage, capacitors are normally designed to work at as high voltage as possible so that they can store more energy. Even without meticulous packaging, the bare electrodes of supercapacitors can be characterized using cyclic voltammetry (CV) analysis. From CV graphs, useful information regarding capacitance, kinetics, stability and cycle-life of the electrodes studied can be attained. Using the cyclic voltammogram in FIG. 1A as example, the capacitance per electrode material can be assessed by the following equation:

$$Cel=2[(i_c+i_a)/2]/(dV/dt) \qquad (2)$$

where $i_c$ and $i_a$ and are cathodic (reduction) and anodic (oxidation) current at 0.0 V, respectively, in Ampere (A), and dV/dt is the voltage scanning rate in volt/sec. Considering a cell is formed by two serially connected electrode-capacitors, a multiplication of 2 appears in equation (2).

FIG. 1A is a cyclic voltammogram of magnetite ($Fe_3O_4$) thin-film formed on 8 cm×8 cm×0.1 mm carbon steel plate by 4-minute cooking in a boiling (ca 140° C.) aqueous solution containing 1 g $NaOH/ml$ $H_2O$ and 12 g $KMnO_4/l$ $H_2O$. Two identical $Fe_3O_4$ electrodes, as working and counter electrode, respectively, in an aqueous solution containing 0.1M $Na_2SO_4$ and 0.5M KOH were used for CV analysis. FIG. 1A was obtained under 50 mV/sec scanning rate without using a reference electrode. Except slight tilt at both ends, the CV loop is a nice rectangle representing good behavior of capacitor rather than electrochemical reactions. By equation (2), the tested magnetite film shows a capacitance of about 1.2 F. Comparing with the regular discharging rates for rating the capacitance of capacitors, the scanning rate of FIG. 1A appears high resulting in low appraisal. Nonetheless, CV is a convenient tool to explore the fundamental properties of the electrode materials of supercapacitors. Sluggish current changes at the inversions of voltage, or at the two ends of the CV loop, are effects due to the resistance of the electrode materials and electrolyte, as well as the presence of excessive micropores on the active materials. The higher the resistance, or the more the micropores, the worse the distortion of the cyclic voltammograms will be.

Chemical oxidation provides a quick and convenient way to convert iron metal into iron oxide. For example, magnetite ($Fe_3O_4$) can be formed rapidly in an aqueous solution of an oxidizing agent such as $NaNO_3$ under strong alkaline and temperatures above 100° C. In the reactions, $Na_2FeO_2$ and $Na_2Fe_2O_4$ are formed first, then they react with each other to form thin $Fe_3O_4$ film on iron substrates or substrates deposited with iron metal as described below:

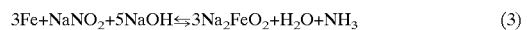
$$3Fe+NaNO_2+5NaOH \leftrightarrows 3Na_2FeO_2+H_2O+NH_3 \qquad (3)$$

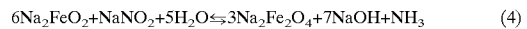
$$6Na_2FeO_2+NaNO_2+5H_2O \leftrightarrows 3Na_2Fe_2O_4+7NaOH+NH_3 \qquad (4)$$

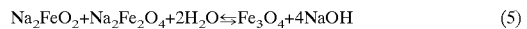
$$Na_2FeO_2+Na_2Fe_2O_4+2H_2O \leftrightarrows Fe_3O_4+4NaOH \qquad (5)$$

In the above reactions, iron is initially dissolved in the alkaline solution to form saturated solution of iron oxide at the solid-liquid interface. Therefrom, crystalline seeds of iron oxide are formed on some area of the iron substrates, and further growth of the seeds results in a continuous film of magnetite. As magnetite film is built up from thickness in nm range to above 2 μm, it will change from lustrous pale-blue to dull-black color. Further oxidation of magnetite will convert the black oxide into reddish-brown iron oxide or hematite ($Fe_2O_3$). Iron oxide formed in aqueous solutions is likely in hydrous states that is best described by a chemical composition of $Fe_xO_yH_z$, where $1.0 \leq x \leq 3.0$, $0.0 \leq y \leq 4.0$, and $0.0 \leq z \leq 1.0$. In addition, a current collector of the capacitor includes iron, steel, aluminum, titanium, copper, nickel, glass, plastics or ceramics. The electrode material of $Fe_xO_yH_z$ can be formed by, for example, chemical oxidation, electrochemical oxidation, electrolytic plating, electroless plating, sputtering, laser ablation, thermal evaporation, chemical vapor deposition, chemical conversion, electrophoretic deposition and combination thereof.

Figure 1B:
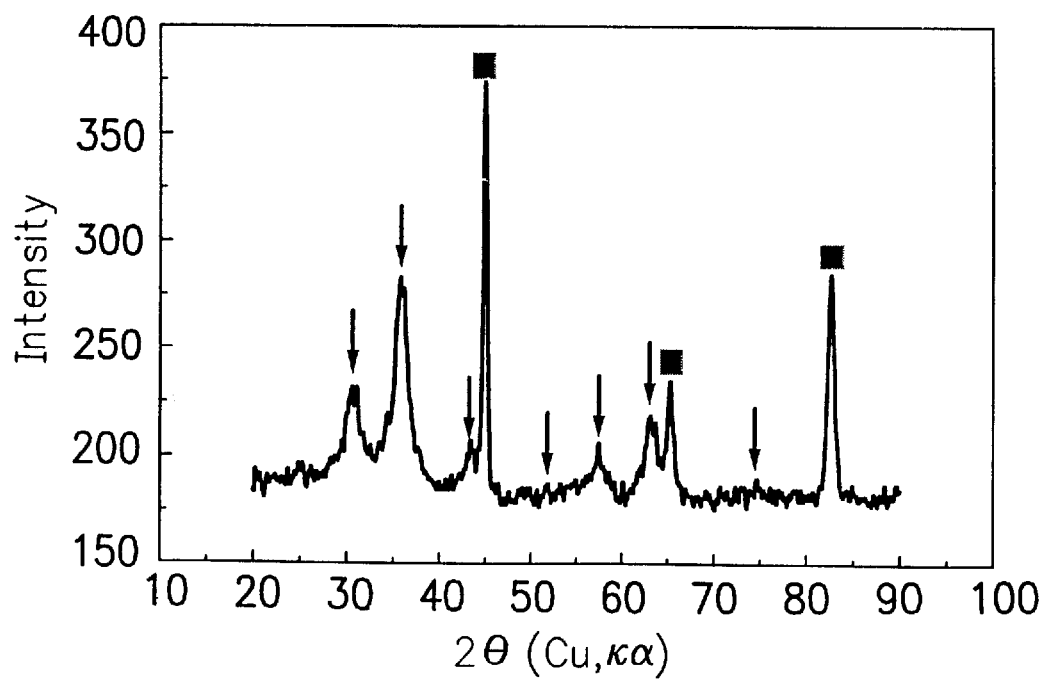
FIG. 1B is the X-ray diffraction pattern of a $Fe_3O_4$ film electrode prepared by chemically oxidizing a carbon steel substrate in a boiling solution containing 1000 g NaOH, 12 g $NaNO_3$ and 12 g $Na_2Cr_2O_7$ in 1 liter de-ionized water, wherein the reflection peaks marked with arrows are due to $Fe_3O_4$, while those marked peaks with solid square marks are due to the substrate, Fe, according to the invention.

Thin black film of iron-oxide has been grown on various iron substrates and non-iron substrates, which are previously deposited metal iron, using chemical oxidation. A black film of 3 μm thickness on an iron substrate was subjected to X-ray diffraction (XRD) analysis, and a spectrum was obtained as shown in FIG. 1B. It indicates that the oxide film is predominantly magnetite ($Fe_3O_4$), the major species responsible for the high energy-storage capacity of iron oxide. The following examples only illustrate, rather than to limit, that the present invention is capable of preparing monolithic electrodes using iron substrates and non-iron substrates, as well as fabricating supercapacitors in various shapes that can be incorporated conceivably with the loads powered by the capacitors.

EXAMPLE 1

Figure 2:
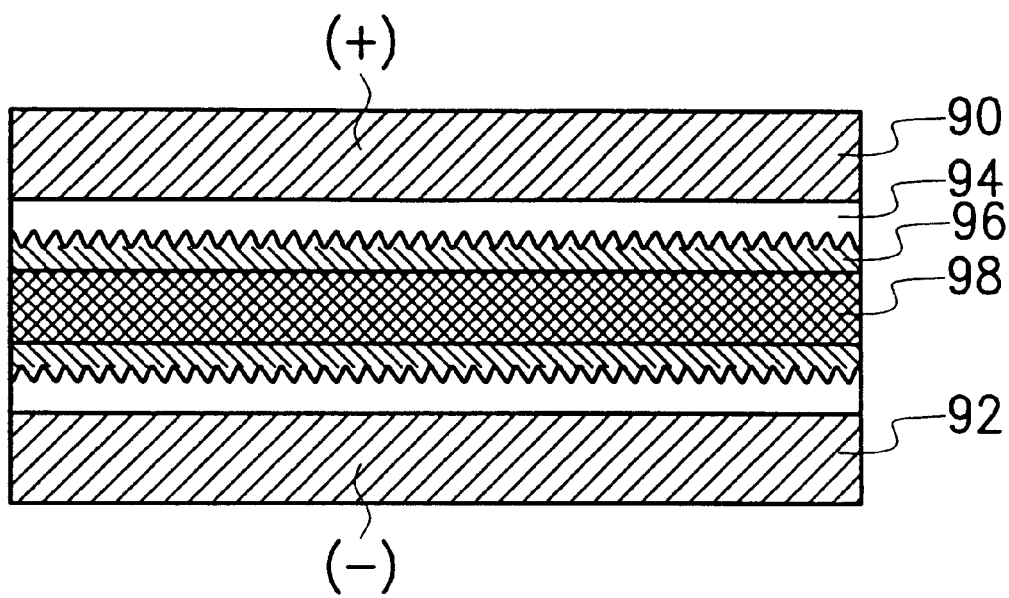
FIG. 2 is a cross-sectional view, schematically illustrating a basic structure of the supercapacitor, according to the invention.

FIG. 2 is a cross-sectional view, schematically illustrating a basic structure of the supercapacitor, according to the invention. In FIG. 2, the supercapacitor basically includes an upper electrode plate 90, a lower electrode plate 92, and a dielectric layer between the two electrode plates 90, 92. According to the invention, the dielectric layer is formed including, for example, an active material layer 94, an electrolyte layer 96, and an isolation layer 98. Since the dielectric layer of the invention is suitable for use with respect to any geometric form of the electrode plate. The electrode plate 90, 92 can be a house of an appliance. The electrode plate 90 can be formed into a desired shape. An example is provided with a geometric form.

Figure 3:
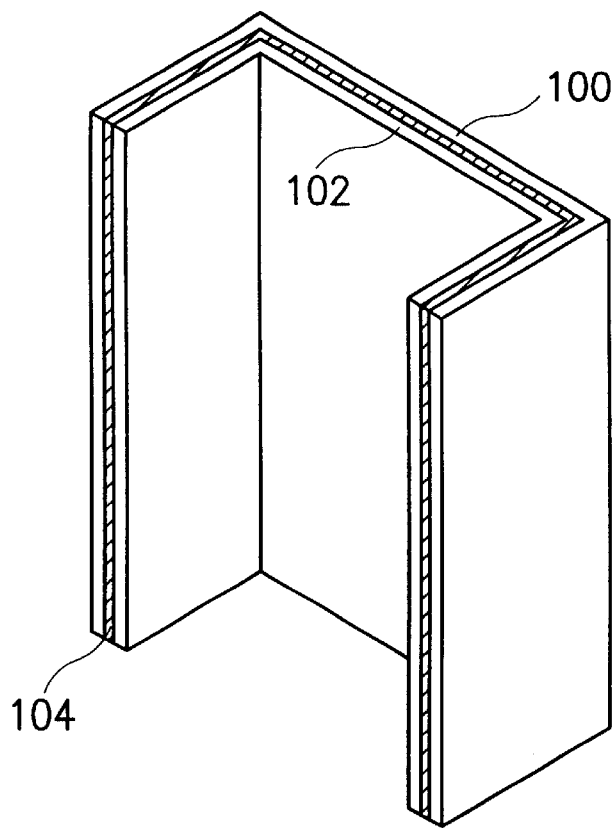
FIG. 3 is a supercapacitor composed by two folded iron plates, wherein the smaller U-shaped plate 102 fit snugly in the bigger U-shaped plate 100 with a narrow space in the middle for an electrolyte 104, according to the invention.

1 mm-thick carbon steel plates were cut and folded into 1.8 cm×3.8 cm×9.9 cm and 1.6 cm×3.6 cm×9.9 cm. As shown in FIG. 3, the smaller U-shaped plate 102 can fit snugly into the bigger U-shaped plate 100 with 1 mm space between them. The substrates were first cleaned using a laboratory detergent followed by water-rinse, then cleaned with acid and water. After sand-paper polishing, the plates were placed in a boiling solution (about 125° C.) containing 600 g NaOH and 12 g $NaNO_3$ in 1 liter DI water. Within 15–20 minutes of cooking, a black film was uniformly deposited on the entire surface of the substrates submerged in the solution. Iron-oxide electrodes in U-shaped were thus obtained after water-rinse and drying by hot air. Two of the U-shaped iron-oxide electrodes, separated by a porous paper 104, were placed in an alkaline solution as FIG. 1A and were subjected to CV analysis using 50 mV/sec scanning rate. By equation (2), the test electrodes with an effective area of 80 $cm^2$ were estimated to have an average capacitance of 0.5 F.

Since the folded-plate-electrodes can be prepared in any configuration and any dimension, they can be used as one side or all sides of cases, chassis, compartments, covers, and housings for appliances, batteries, devices, equipment, instruments and electric vehicles. Using chemical oxidation, the inside surface of the cover plates are coated with iron oxide, which are then overlaid by smaller iron-oxide-coated plates with oxide layers facing each other. A small gap, for example 0.1 mm, is provided between every two plates in which a selected separator and a selected electrolyte are filled. If the two plates can be secured without contact, the separator may not be necessary. The second or bottom plates can be much thinner than the cover plates. Welding or other mechanical means can be used to secure, seal and insulate the parallel plates. With the iron oxide and an electrolyte in the enclosure, supercapacitors are thus integrated with the loads as described above. While the second set of plates occupy a very small space beneath the covers, and the added separator and electrolyte are in little quantity, supercapacitors are created very efficiently. In general, the electrode plates can include die-pressed plates or extruded plates, which are formed by a die-pressed technology or the extruding technology. Further still, the electrode plates can also be formed in a wave-like shape or a wedge shape. The thickness of the plates can be greater than or equal to 0.1 mm.

EXAMPLE 2

Figure 4:
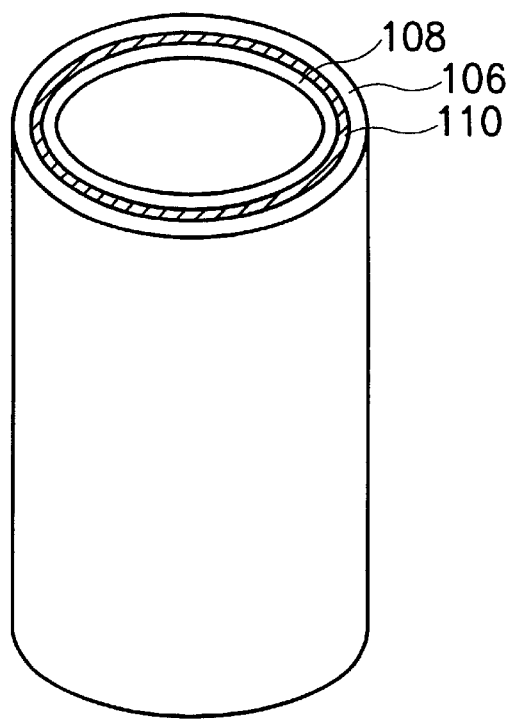
FIG. 4 is a supercapacitor composed by two concentric iron tubes, wherein the gap between the outside tube 106 and the inside tube 108 constitutes a compartment for an electrolyte 110, wherein if the two iron tubes can be physically secured, no separator is required, according to the invention.

FIG. 4 shows another shape of substrates consisting of two concentric tubes of 1 mm-thick galvanized cast iron. When the tubes constitute a capacitor, only the surfaces opposing to each other are effective in providing capacitance. It is measured that the inside diameter of the larger tube 106 is 2.8 cm, while the outside diameter of the smaller tube 108 is 2.6 cm. Thus, there is a gap 110 of 2 mm between the iron tubes, and the gap is to be filled with a separator and an electrolyte. Three different lengths, 2 cm, 5 cm and 10 cm, of the iron tubes were used for testing. Thin-film of iron oxide were deposited on the inside surface of the larger tubes, as well as on the outside surface of the smaller tubes following the same procedures as Example 1. Following the CV measurement as Example 1, three concentric-tube-electrodes, at different length, were analyzed. The results are listed in Table 1:

TABLE 1

| Supercapacitiors in Tube Configuration | | | |
| --- | --- | --- | --- |
| Length (cm) | 2 | 5 | 10 |
| Effective Area ($cm^2$) | 16 | 40 | 81 |
| Capacitance (F) | 0.05 | 0.09 | 0.7 |

Supercapacitors can be prepared using concentric tubes in the shape of round, square, rectangle, triangle, or polyhedron. Without changing the design and integrity of vehicles, the frames of electric automobiles, bicycles, motorcycles, scooters and wheelchairs can be employed as the outside tubes whose inner surface is deposited with iron oxide by chemical oxidation. Iron-oxide-coated tubes of smaller diameters but in identical shape are then inserted in the frames with oxide layers facing each other. Again, a small gap 110 is provided between every two tubes in which a selected separator and a selected electrolyte are filled. Every two tubes can be secured, sealed and insulated by welding or other mechanical means. Hereby, supercapacitors are fabricated conceivably and firmly at a minimal increase in weight to the loads powered by the capacitors.

EXAMPLE 3

Figure 5:
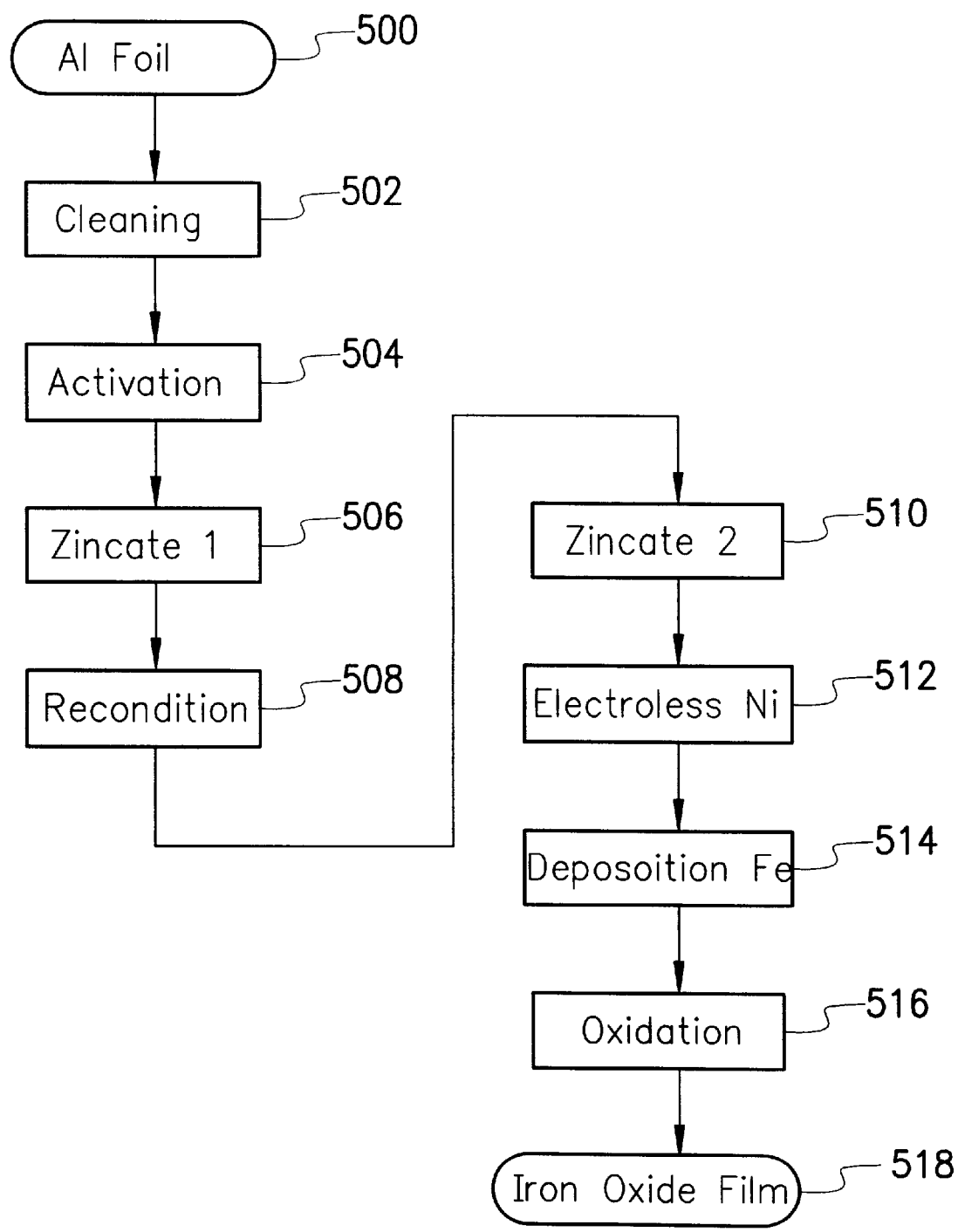
FIG. 5 is a flow chart of converting aluminum foil to monolithic electrode in $Fe_3O_4/Fe,Ni,Zn/Al$ structure, according to the invention.

This example illustrates how the present invention converts a non-iron substrate into monolithic electrodes for supercapacitors. FIG. 5 is a flow chart of converting aluminum to the iron-oxide electrode. Firstly, a 40 mil-thick plain aluminum foil was cut to 8 cm×8 cm at step 500. In step 502, the substrates were cleaned in an aqueous solution containing 30 g of S-438PC cleaner (Schlötter GmbH, Germany) in 1 liter de-ionized water at 50° C. for 1 minute. Then, the substrates were removed, rinsed with DI water, and the substrates were subjected to activation of step 504. In which 25% $HNO_3$ solution was applied to the substrates for 20 sec at the ambient. Following DI water rinsing, a chemical conversion known as zincating denoted by Zincate 1 of step 506 was conducted on the substrates using a commercial conditioner (SBZ from Schlötter) at 25% concentration in DI water under room temperature for 30 sec. In the conversion, a thin layer of zinc was deposited on the aluminum foil. Afterwards, the substrates were water-rinsed and reconditioned using 25% $HNO_3$ solution at step 508 to smooth the surface of substrates. Another zincating treatment, i.e. step 510, was given to the substrates to increase the thickness of Zn layer. With the modified surface, aluminum foil was deposited Ni in electroless plating using a commercial plating solution, NIRUNA® 813 (Degussa GmbH, Germany) at step 512. The electroless plating was conducted at pH 4.8–5 and 88° C. for 5 minutes. A distinctive gray layer of Ni was obtained and washed with DI water followed by electrolytic plating of iron at step 514 using the bath solution of Table 2.

TABLE 2

Electrolytic Plating Bath of Iron

| Chemicals | Amount |
|---|---|
| $FeSO_4, 7H_2O$ | 250 g/l $H_2O$ |
| $(NH_4)_2SO_4$ | 60 g/l $H_2O$ |
| 1 M $H_2SO_4$ | 3–5 ml |

Using the substrate as cathode and an iron plate as anode, the electrolytic plating was proceeded at pH 2.0, room temperature and 4 $A/dm^2$ current density for 5 minutes. Finally, the clean iron-coated substrates were oxidized in step 516 where the substrates were completely submerged in a boiling (97° C.–100°C.) solution consisting of 12 g $KMnO_4$ and 12 g $NaNO_3$ in 1 liter DI water. After 5-minute cooking, the iron deposit became black material which was rinsed with DI water and dried with hot air in step 518. Monolithic electrodes with a plausible structure of $Fe_3O_4$/Fe,Ni,Zn/Al were thereupon fabricated.

Separated by a porous paper, two pieces of 8 cm×8 cm $Fe_3O_4$/Al electrode were analyzed with CV using the same electrolyte as FIG. 1A. At 50 mV/sec scanning rate, the cell yielded a capacitance of 0.2 F, or 3 $mF/cm^2$, according to equation (2). Though the withstanding voltage of the cell is 1 volt, its capacitance is much higher than those of conventional aluminum electrolytic capacitors. Due to the vulnerable property of aluminum to strong bases, NaOH, the catalyst for oxidizing iron to iron oxide, was not added in the oxidizing solution of FIG. 5. It is very likely, that the iron oxide film on the aluminum foil was less than 3 μm, a thickness normally obtained with iron substrates. Hence, the capacitance of the present example is smaller than 0.03 $F/cm^2$, which is normally obtained with cells measured in the same electrolyte as FIG. 1A. To those skilled in the art, non-iron metals such as Ti, Cu and Ni as well as non-metal substrates such as glass, plastics and ceramics can be easily deposited with metal iron by sputtering, and by a chemical conversion and plating processes similar to FIG. 5. As long as metal iron is deposited, it can be quickly oxidized to iron oxide and used as monolithic electrodes for supercapacitors.

EXAMPLE 4

1 cm×1 cm carbon steel substrates were cooked in one liter de-ionized water containing 600 g NaOH, 12 g $NaNO_3$ at 135–140° C. for 15–20 minutes to produce a 3 μm composite iron-oxide layer predominantly in $Fe_3O_4$. A sandwich-type cell was prepared by disposing a glass-fiber separator soaked with 1M $Na_2SO_4$ electrolyte between two iron-oxide electrodes. The cell was analyzed by CV using 50 mV/sec scanning rate between −0.8 volt and +0.8 volt. By equation (2), $C_{e1}$ of the electrode material studied was determined to be 0.5 $F/cm^2$. Assuming the density of the porous oxide layer is 4.0 $g/cm^3$, and using the known layer thickness of 3 μm, the above capacitance is converted to a specific capacitance of 417 F/g of the electrode material. Pure $Na_2SO_4$ tends to yield an order-of-magnitude higher capacitance than $Na_2SO_4$ doped with KOH such as the electrolyte in FIG. 1A can do for the same iron-oxide electrodes. However, the electrodes are more stable in the electrolytes with the presence of an alkaline base.

EXAMPLE 5

1 cm×1 cm×0.1 mm copper and titanium foil were used as the substrates for preparing iron-oxide electrodes, respectively. They were first deposited with metal iron from 5-minute electrolytic plating in an aqueous solution containing 250 g $FeSO_4$ and 120 g $(NH_4)_2SO_4$ in 1 liter DI water under room temperature and a current density of 0.06 $A/cm^2$. Subsequently, the iron-coated substrates were subjected to 5-minute chemical oxidation in a boiling solution as Example 1. Using the same electrolyte and scanning rate as FIG. 1A, the Cu/Fe/$Fe_3O_4$ electrode exhibited a capacitance of 0.04 F, while Ti/Fe/$Fe_3O_4$ gave 0.01 F.

EXAMPLE 6

Figure 6:
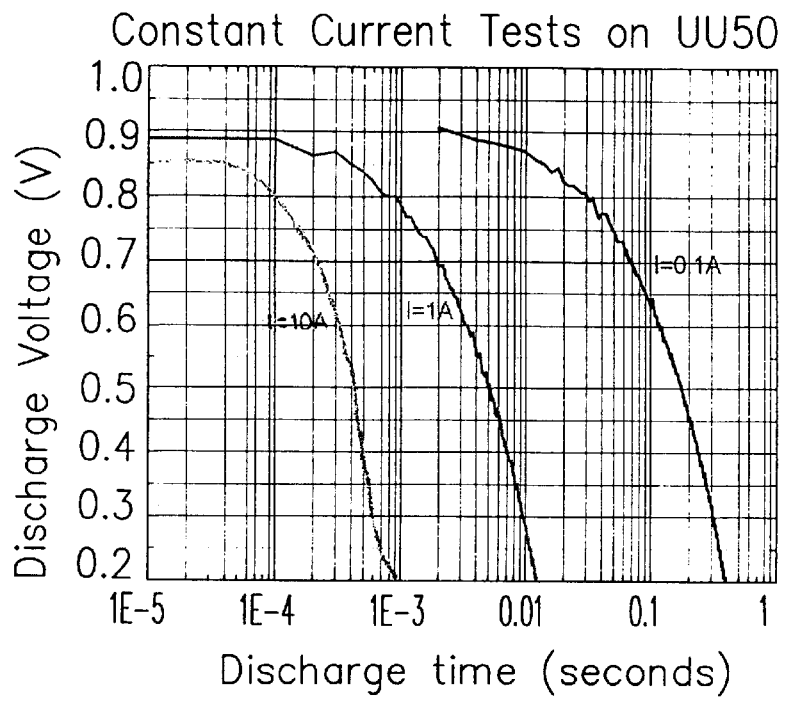
FIG. 6 is a group of constant-current discharge diagrams of a U-shaped, as shown in FIG. 3, according to the invention.
Figure 7:
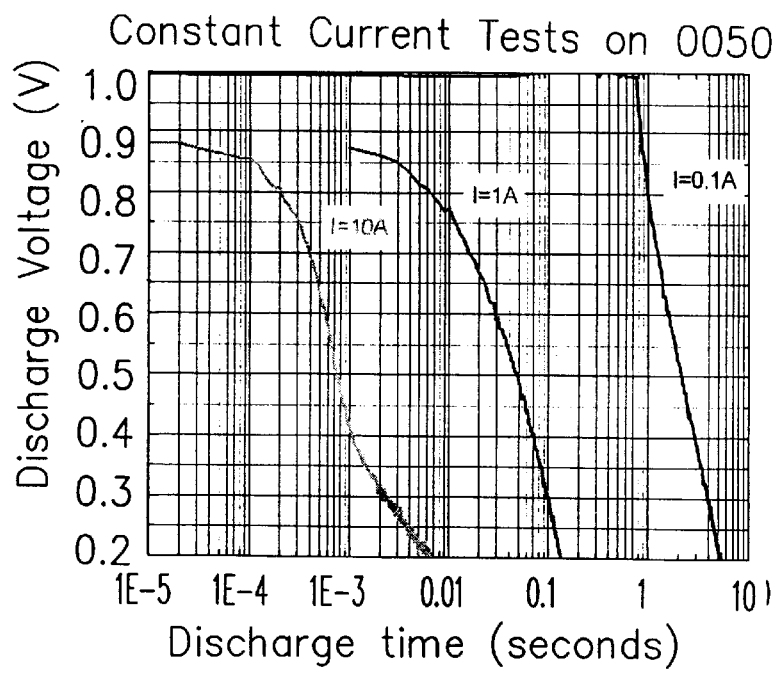
FIG. 7 is a group of constant-current discharge diagrams of a supercapacitor composed of two concentric galvanized iron tubes, according to the invention.

According to examples 1 and 2, a U-shaped and a tube-shape supercapacitors were prepared, respectively. Both of the two capacitors have about 10-cm in length, using a piece of paper soaked with an aqueous electrolyte containing 0.1M $Na_2SO_4$ and 0.5M KOH as separator, and two small steel strips welded to the outside surface of the electrodes as the electric leads. Finally, the capacitors were sealed with an epoxy adhesive. After a full charge to 1V, the capacitors were discharged under various constant currents. FIG. 6 depicts the discharge of the U-shaped capacitor, while FIG. 7 for the tube one. Using the section from 0.8V to 0.4V of each discharge curve, the capacitance under each load is shown in Table 3. Though the effective area of the U-shaped capacitor is smaller than that of the tube one, that is, 67 $cm^2$ vs. 81 $cm^2$, the difference in the capacitance is beyond the size effect can account for. Obviously, the U-shaped capacitor has a higher leakage rate in current, which may be due to the U-shaped has a larger surface exposed.

TABLE 3

| | Load (A) | | |
|---|---|---|---|
| | Capacitance (F) | | |
| Capacitor | 0.1 | 1 | 10 |
| U shaped | 0.05 | 0.02 | 0.01 |
| Tube shape | 0.47 | 0.16 | 0.02 |

Nevertheless, the above examples only to demonstrate the feasibility of the present invention. As the prototypes were prepared rather primitively and they showed promising results, various supercapacitors with large capacitance can be fabricated commercially in any dimension, any shape and desirable configuration using the present invention. For example, two concentric tubes are formed together with a shape of round shape, triangular shape, square shape, rectangular shape, or polyhedral shape. The thickness of the electrode plates preferably is greater than or equal to 0.1 mm.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An electrochemical capacitor with capacitance greater than or equal to 0.1 F, the capacitor comprising:

a first electrode of the capacitor that comprises at least one electrode material having a chemical composition of $Fe_xO_yH_z$, where $1.0 \leq x \leq 3.0$, $0.0 \leq y \leq 4.0$ and $0.0 \leq z \leq 1.0$, wherein the first electrode in conformal shape is formed on a current collector and the current collector is at least a portion of a peripheral surface of one selected from the group consisting of case, chassis, compartment, cover, housing, and frames of one selected from the group consisting of appliance, battery, device, equipment, instruments, electric automobile, bicycle, motorcycle, scooter and wheelchair;

a second electrode formed in conformal shape over the first electrode, wherein the second electrode can also include the same electrode material for the first electrode; and a separator with an electrolyte formed between the first electrode and the second electrode, whereby a built-in electrochemical capacitor is formed thereon.

2. The electrochemical capacitor in accordance with claim 1, wherein the electrode material $Fe_xO_yH_z$ includes one selected from the group consisting of Fe, FeO, $Fe_3O_4$, $Fe_2O_3$, FeO(OH) and combinations thereof, wherein the electrode material is an in-situ structure grown on the current collector.

3. The electrochemical capacitor in accordance with claim 1, wherein the current collector of the electrochemical capacitor comprises one selected from the group consisting of iron, steel, aluminum, titanium, copper, nickel, glass, plastics and ceramics, whereby the current collector is to support the electrode material $Fe_xO_yH_z$ for delivering capacitances greater than or equal to 0.1 F to loads.

4. An electrochemical capacitor, comprising at least two electrodes which are machine-folded plates in conformal to an outer shape of an appliance, one of the electrodes utilizes a current collector that is the appliance selecting from the group consisting of a case, a chassis, a cover, a frame or a housing of electric automobile, bicycle, motorcycles, scooter, and wheelchairs, die-pressed plates and extruded plates.

5. The electrochemical capacitor in accordance with claim 4, wherein the plates have thickness $\geq 0.1$ mm.

6. An electrochemical capacitor wherein at least two electrodes are wave-shaped plates in conformal to an outer shape of an appliance, in which one of the electrodes utilizes a current collector that is the appliance selecting from the group consisting of a case, a chassis, a cover, a frame or a housing of electric automobile, bicycle, motorcycles, scooter, and wheelchairs.

7. The electrochemical capacitor in accordance with claim 6, wherein the plates have thickness $\geq 0.1$ mm.

8. An electrochemical capacitor wherein at least two electrodes are two concentric tubes in conformal to an outer shape of an appliance, in which one of the electrodes utilizes a current collector that is the appliance selecting from the group consisting of a case, a chassis, a cover, a frame or a housing of electric automobile, bicycle, motorcycles, scooter, and wheelchairs.

9. The electrochemical capacitor in accordance with claim 8, wherein the two tubes include a round shape, in which both the electrodes are in a round shape.

10. The electrochemical capacitor in accordance with claim 8, wherein the two tubes include a triangle shape, in which both the electrodes are in the triangle shape.

11. The electrochemical capacitor in accordance with claim 8, wherein the two tubes include a square shape, in which both the electrodes are in a square shape.

12. The electrochemical capacitor in accordance with claim 8, wherein the two tubes include a rectangle shape, in which both the electrodes are in rectangle shape.

13. The electrochemical capacitor in accordance with claim 8, wherein the two tubes include a polyhedral shape, in which both the electrodes are in polyhedral shape.

14. An electrochemical capacitor with capacitance greater than or equal to 0.1 F, which is integrated with one side or four sides of cases, chassis, compartments, covers, and housings for one selected from the group consisting of appliances, batteries, devices, equipment and instruments.

15. An electrochemical capacitor with capacitance greater than or equal to 0.1 F, which is conformally integrated with at least a portion of a peripheral surface of one selected from the group consisting of case, chassis, compartment, cover, and housing for one selected from the group consisting of appliance, battery, device, equipment, and instruments, whereby the electrochemical capacitor is a built-in capacitor structure.

16. An electrochemical capacitor with capacitance greater than or equal to 0.1 F, wherein the electrochemical capacitor is integrated with at least a portion of a peripheral surface of a frame or a chassis for one selected from the group consisting of electric automobile, bicycle, motorcycle, scooter and wheelchair, whereby the electrochemical capacitor is a built-in capacitor structure.

* * * * *